US007259192B2

(12) United States Patent
Liu et al.

(10) Patent No.: US 7,259,192 B2
(45) Date of Patent: Aug. 21, 2007

(54) MOLECULAR WEIGHT REDUCTION OF POLYSACCHARIDES BY ELECTRON BEAMS

(75) Inventors: Leo Zhaoqing Liu, Lawrenceville, NJ (US); Christian Priou, Charbonnieres-les-Bains (FR)

(73) Assignee: Rhodia, Inc., Cranbury, NJ (US)

( * ) Notice: Subject to any disclaimer, the term of this patent is extended or adjusted under 35 U.S.C. 154(b) by 135 days.

(21) Appl. No.: 10/606,256

(22) Filed: Jun. 24, 2003

(65) Prior Publication Data

US 2004/0072699 A1 Apr. 15, 2004

Related U.S. Application Data

(60) Provisional application No. 60/391,320, filed on Jun. 25, 2002.

(51) Int. Cl.
*C08F 2/46* (2006.01)
*C09K 3/32* (2006.01)

(52) U.S. Cl. ............................ 522/88; 522/86; 522/89; 522/104; 522/150; 522/153; 527/300; 527/400; 527/600; 507/200; 507/203; 507/209; 507/213; 507/214

(58) Field of Classification Search .................. 522/88, 522/87, 86, 89, 104, 150, 153; 527/300, 527/400, 600; 507/200, 203, 209, 213, 214
See application file for complete search history.

(56) References Cited

U.S. PATENT DOCUMENTS

| | | | | |
|---|---|---|---|---|
| 1,255,723 | A | 2/1918 | Ewen | |
| 2,895,891 | A | 7/1959 | Miller | |
| 3,766,031 | A | 10/1973 | Dillon | |
| 3,974,077 | A | 8/1976 | Free | |
| 4,021,355 | A * | 5/1977 | Holtmyer et al. | 507/211 |
| 4,057,509 | A | 11/1977 | Costanza | |
| 4,105,665 | A | 8/1978 | Harnisch | |
| 4,143,007 | A | 3/1979 | DeMartino | |
| 4,169,945 | A | 10/1979 | DeGuia | |
| 4,505,826 | A * | 3/1985 | Horton | 507/203 |
| 4,657,080 | A | 4/1987 | Hodge | |
| 4,686,052 | A | 8/1987 | Baranet | |
| 5,273,767 | A | 12/1993 | Burgum | |
| 5,352,277 | A | 10/1994 | Sasaki | |
| 5,366,755 | A | 11/1994 | Timonen | |
| 5,422,134 | A | 6/1995 | Hart | |
| 5,525,368 | A | 6/1996 | Rha | |
| 5,569,483 | A | 10/1996 | Timonen | |
| 5,688,775 | A | 11/1997 | Renn | |
| 5,738,836 | A | 4/1998 | Gan | |
| 5,756,720 | A | 5/1998 | Chowdhary | |
| 5,916,929 | A | 6/1999 | Knobel | |
| 6,242,035 | B1 | 6/2001 | Clark | |
| 6,383,344 | B1 | 5/2002 | Miller | |
| 6,486,138 | B1 | 11/2002 | Asgharian | |
| 6,884,884 | B2 * | 4/2005 | Magallanes et al. | 536/114 |

FOREIGN PATENT DOCUMENTS

| | | |
|---|---|---|
| EP | 0534 639 | 3/1993 |
| EP | 0559418 | 9/1993 |
| EP | 1 267 034 | 12/2002 |
| GB | 1255723 | 12/1971 |
| WO | WO 02/06348 | 1/2002 |
| WO | WO 0212388 | 2/2002 |
| WO | WO 02/100902 | 12/2002 |

OTHER PUBLICATIONS

King, et al., "The effect of Gamma Irradiation on Guar Gum, Locust Bean Gum (Gum Tragacanth) and Gum Karaya," Food Hydrocolloids, vol. VI, No. 6, pp. 559-569, (1993).

Database Chemical Abstracts, Chemical Abstracts Service, Columbus Ohio, "Method for manufacturing low molecular polysaccharide and oligosaccharide thereof," Accession No. 136:185632, Abstract, and KR 2000 036 332 A (S. Korea), Jul. 5, 2000.

* cited by examiner

*Primary Examiner*—Sanza L. McClendon
(74) *Attorney, Agent, or Firm*—John S. Child, Jr.

(57) ABSTRACT

A method of depolymerizing galactomannan-type polysaccharide polymers and xanthan, preferably galactomannans, to a pre-selected lower molecular weight by irradiation with high energy electron beams. The preferred galactomannans for treatment according to this method are guar gum, guar splits and hydroxypropyl guar. In a preferred embodiment the guar gum is depolymerized preferably to a molecular weight of about 150,000 Daltons to about 200,000 Daltons. The depolymerized guar has a polydispersity of less than about 3.0 and is useful in oil well fracturing to enhance oil production.

14 Claims, 6 Drawing Sheets

MOLECULAR WEIGHT REDUCTION OF POLYSACCHARIDES BY ELECTRON BEAMS

CROSS-REFERENCE TO RELATED APPLICATIONS

This Application claims the benefit under 35 U.S.C. § 119 of U.S. Provisional Application No. 60/391,320, filed Jun. 25, 2002.

FIELD OF THE INVENTION

The invention relates to a method of irradiation by high energy electron beams of polysaccharide polymers, in particular, galactomannans such as guar gum and xanthan and xanthan gum, in order to depolymerize these polymers, and the depolymerized polymers produced according to this method.

BACKGROUND OF THE INVENTION

Polysaccharides, in particular, galactomannans such as guar and hydroxypropyl guar, and xanthan and xanthan gum, have a variety of uses. Guar in the form of gum is used primarily in food and personal care products for its thickening property. The gum has five to eight times the thickening power of starch. Guar gum is also used as a fracturing aid in oil production.

Guar gum is the mucilage found in the seed of the leguminous plant *Cyamopsis tetragonolobus*. The seeds are composed of a pair of tough non-brittle endosperm sections, hereinafter referred to as guar splits. Guar splits contain guar gum but are tough and extremely difficult to grind into a powder form for recovery of the gum. After processing, native guar gum is obtained in the form of a yellow powder and has a molecular weight of between about 2,000,000 Daltons and 5,000,000 Daltons.

In certain applications forguargum, such as in food products and personal care compositions in oil well fracturing and petroleum recovery, it is preferred to use a relatively low molecular weight material for better performance. For example, in oil wells when used as a fracturing aid it is preferable that guar gum have a molecular weight of between 100,000 Daltons and 250,000 Daltons, as such lower molecular weight gum achieves better high fracture conductivity and low formation damage results in oil production operations. In addition, as guar gum used in oil field applications is modified by means of crosslinking additives as will be discussed below, the depolymerized guar must be capable of crosslinking.

Guar gums of lower molecular weights have been obtained by depolymerizing the native gum. One method of depolymerizing guar currently in use is through treatment with hydrogen peroxide. However, depolymerization via hydrogen peroxide treatment has the disadvantage that it is difficult to control so as to yield guar gum of a pre-selected range of molecular weights. More specifically, hydrogen peroxide treatment generally produces depolymerized guar gums having a polydispersity of between 3 and 5, which is too high. (Polydispersity is defined as the weight average molecular weight divided by the number average molecular weight of the treated guar.) The depolymerized guar gum used in oil well production should have a polydispersity value of no greater than about 3.0. This depolymerization method also causes the guar gum to form agglomerates with hydrogen peroxide, which reduces the purity of the depolymerized guar.

U.S. Pat. No. 5,273,767 relates to a method of preparing a modified rapidly hydrating xanthan and/or guar gum and sterilizing food products comprising xanthan and/or guar gum by irradiation. The irradiation may be carried out with a high energy electron beam at a level between about 0.1 and 4.5 Mrad.

U.S. Pat. No. 6,383,344 B1 discloses a method of reducing the molecular weight of polysaccharide polymers, in particular, hyaluronic acid and carboxymethylcellulose, by irradiation of the polymers. The specific forms of irradiation disclosed are by gamma rays and microwaves. The preferred form disclosed is gamma radiation. However, the use of gamma radiation requires rigorous safety precautions as gamma radiation generated from a radioactive source is highly toxic.

An article by King et al., entitled "The effect of Gamma Irradiation on Guar Gum, Locust Bean Gum (Gum Tragacanth) and Gum Karaya," Food Hydrocolloids, Volume VI, No.6, pp.559-569, 1993, reports on treatments of galactomannans, such as guar gum, with low doses of gamma radiation. The resulting products were disclosed as having lower viscosities. The article indicates that viscosity of solutions of guar gum and locust bean gum decrease with increasing gamma irradiation dose when irradiated in dry powder form.

British Patent Publication No. 1,255,723 relates to the depolymerization of a water soluble cellulose ether by high energy electron beam irradiation. The process involves irradiating a layer of a free-flowing particulate, water-soluble cellulose ether, said layer having a uniform depth adjusted to within ten percent (10%) of the penetration depth of the beam. Cellulose ether is a substituted polysaccharide but not a galactomannan. This patent does not disclose the depolymerization of polymers to form a product having a preselected molecular weight range or a polydispersity value of less than about 3.0.

According to U.S. Pat. No. 5,916,929, irradiation of polymer materials yields two types of substantially different products. Some high polymers such as polyethylene and its copolymers, polybutadiene, polyvinylchloride, natural rubber, polyamides, polycarbonamides and polyesters, undergo molecular combination and eventually become crosslinked. Crosslinking essentially increases the molecular weight of a polymer and increases its melt viscosity, as measured by the melt flow rate, i.e., the numerical value of the melt flow rate decreases. A second class of polymers such as polypropylene, polyvinylidene chloride and fluorocarbon polymers, including polytetrafluoroethylene are known to undergo polymer degradation when irradiated with high energy ionizing radiation. This chain scissioning tends to decrease the molecular weight of the polymer, which is reflected by a decrease in the melt viscosity properties, as measured by an increase in the melt flow rate (MFR).

SUMMARY OF THE INVENTION

It is an objective of the invention to depolymerize polysaccharides, in particular, galactomannans, such as guar gum and xanthan gum, to form a product having a preselected lower molecular weight falling within a very narrow weight range.

It is another objective of the invention to depolymerize guar splits to a predetermined molecular weight to facilitate the use of guar splits and the recovery of guar gum from guar splits.

It is also an objective of the invention to provide a method for depolymerization of polysaccharides, and in particular guar gum, with reduced levels of impurities in the final product.

It is a further objective of the invention to provide a polysaccharide depolymerization method that can be carried out at approximately room temperature, and without the use of radioactive materials as a source of depolymerizing radiation.

It is yet a further objective of the invention to produce a depolymerized galactomannan and xanthan gum having a pre-selected molecular weight and a polydispersity of less than about 3.0 and that undergoes rapid hydration.

These and other objectives are achievable by the methods of the invention in which polysaccharide polymers, in particular, xanthan and galactomannans such as guar gum, xanthan gum, guar splits, water swollen guar splits and hydroxypropyl guar powder are depolymerized by high energy electron beam irradiation. According to the invention, guar gum, which has a molecular weight of at least 2,000,000 Daltons is depolymerized to a lower pre-selected weight. These depolymerized products are useful in food applications, cosmetics, pharmaceuticals and other industrial applications, such as flowable pesticides, liquid feed supplements, cleaners, ceramics and coatings. In a preferred embodiment, the depolymerization is carried out to produce guar gum having a molecular weight below about 700,000 Daltons. In a more preferred embodiment, the depolymerization is carried out to produce a galactomannan having a molecular weight below about 500,000 Daltons. In a particularly preferred embodiment, the depolymerization is carried out to produce a galactomannan to a molecular weight of below about 300,000 Daltons. In the most preferred embodiment, the depolymerization is carried out to produce a galactomannan having a molecular weight between about 100,000 Daltons and about 250,000 Daltons and a polydispersity of less than about 3.0 Daltons, in which at least 90% changes to a hydrated state within three (3) minutes. The method of the invention is also applicable to the depolymerization of other galactomannans. Also within the scope of the invention is the depolymerized product, in particular, guar gum and substituted guar gum produced according to the method described herein, and most preferably a product having the pre-selected molecular weight, and weight ranges referenced above and a polydispersity of less than about 3.0, and that is at least 90% hydrated within three (3) minutes. These depolymerized products are particularly useful as fracturing agents in oil production.

The type and dosage of the high energy electron beams that are employed in the practice of this invention will vary, depending on the type of polysaccharide polymer being treated, the degree of molecular weight reduction desired and the rate of depolymerization desired. With respect to the depolymerization of guar gum, the dosage of electron beam radiation to which the guar gum is exposed will vary preferably from about 1 Mrad to about 15 Mrad, but dosages of electron beam radiation that are lower and higher than this preferred range can also be used.

DETAILED DESCRIPTION OF THE INVENTION

A. Polysaccharides

Figure 1:
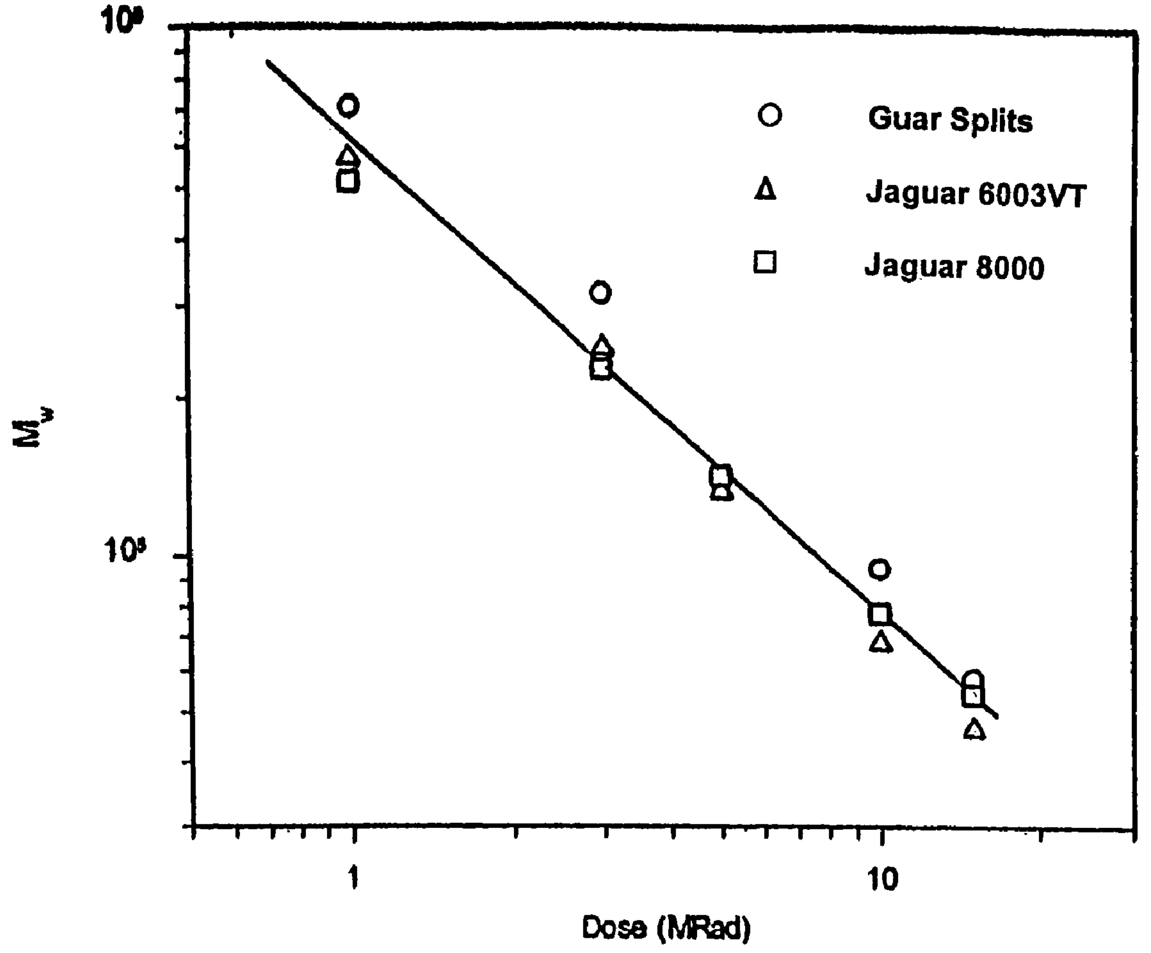
FIG. 1 is a graph showing a decrease in the molecular weight of guar gum obtained from guar splits, Jaguar 6003VT and Jaguar 8000 guar as a function of exposure to increasing radiation doses from a high energy electron beam.
Figure 2:
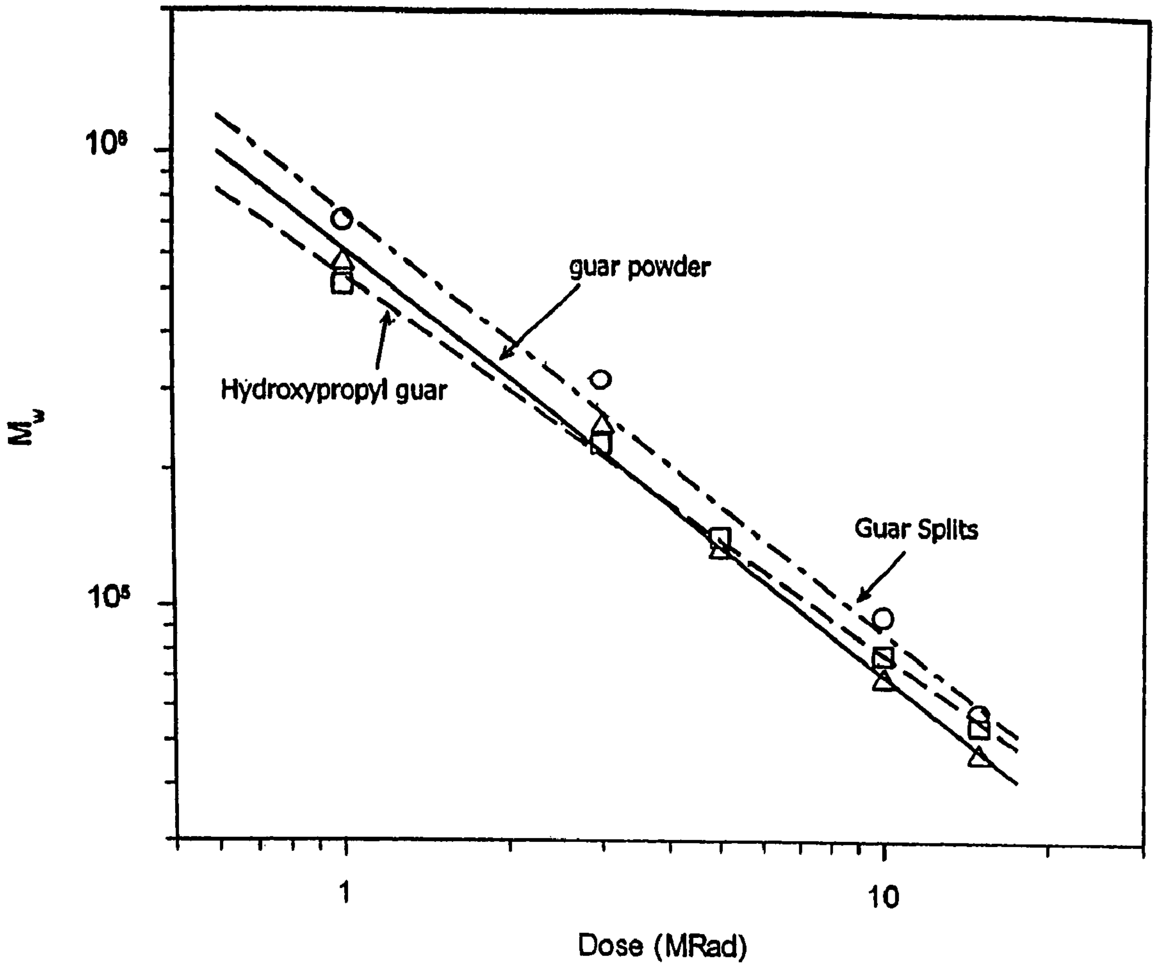
FIG. 2 is a graph showing the molecular weights of guar gum obtained from guar powder, guar splits and hydroxypropyl guar from high energy electron beams.
Figure 3:
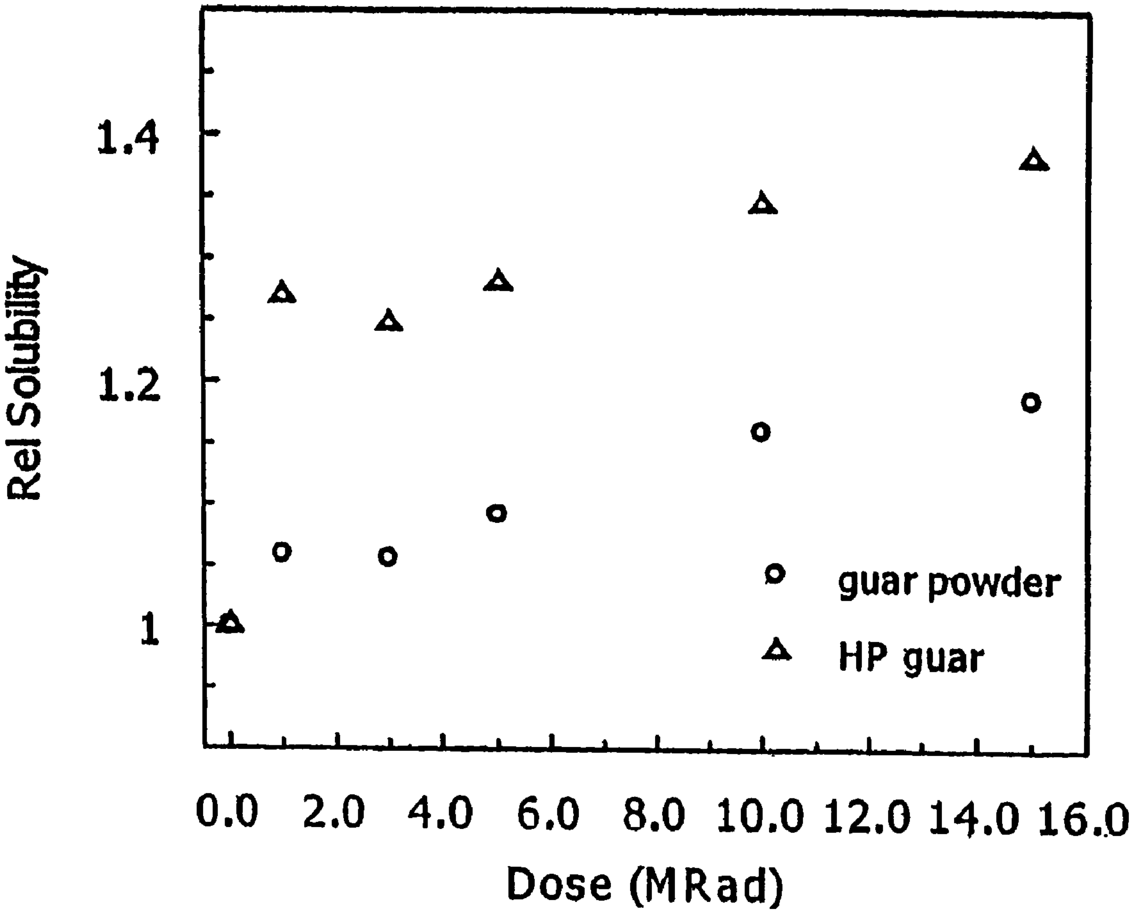
FIG. 3 is a graph showing an increase in the relative solubility in water of materials obtained from guar powder, or hydroxypropyl guar as a function of exposure to increasing radiation doses.

The term "polysaccharide" as used herein refers to a polymer having repeated saccharide units, including starch, polydextrose, lingocellulose, cellulose and derivatives of these (e.g., methylcellulose, ethylcellulose, carboxymethylcellulose, hydroxyethylcellulose, cellulose acetate, cellulose acetate butyrate, cellulose acetate propionate, starch and amylase derivatives, amylopectin and its derivatives and other chemically and physically modified starches) and the like.

B. Galactomannans

Galactomannans are polysaccharides consisting mainly of the monosaccharides mannose and galactose. The mannose-elements form a chain consisting of many hundreds of (1→4)-β-D-mannopyranosyl-residues, with 1→6 linked α-D-galactopyranosyl-residues at varying distances, dependent on the plant of origin. The galactomannans of the present invention may be obtained from numerous sources. Such sources include guar gum, guar splits, cationic and nonionic guar, locust bean gum and tara gum, as further described below. Additionally, the galactomannans may also be obtained by classical synthetic routes or may be obtained by chemical modification of naturally occurring galactomannans.

1. Guar Gum

Guar gum, often called "guar flour" after grinding, refers to the mucilage found in the seed of the leguminous plant *Cyamopsis tetragonoloba*. The water soluble fraction (85%) is called "guaran," which consists of linear chains of 1→4)-.beta.-D mannopyranosyl units-with .alpha.-D-galactopyranosyl units attached by (1→6) linkages. The ratio of D-galactose to D-mannose in guaran is about 1:2. Guar gum may take the form of a whitish powder which is dispersible in hot or cold water. Guar gum may be obtained, for example, from Rhodia, Inc. (Cranbury, N.J.), Hercules, Inc. (Wilmington, Del.) and TIC Gum, Inc. (Belcamp, Md.).

2. Guar Splits

Guar seeds are composed of a pair of tough, non-brittle endosperm sections, hereafter referred to as "guar splits," between which is sandwiched the brittle embryo (germ). After dehulling, the seeds are split, the germ (43-47% of the seed) is removed by screening, and the splits are ground. The gum is present in the splits contained in tiny cells having a water-insoluble cell wall. The gum in these cells is rather slowly dispersible in water, and accordingly it is desirable to disrupt the cell wall as well as to obtain a fine particle size.

The splits are reported to contain about 78-82% galactomannan polysaccharide and minor amounts of some proteinaceous material, inorganic salts, water-insoluble gum, and cell membranes, as well as some residual seedcoat and embryo. They are tough and extremely difficult to grind.

3. Locust Bean Gum

Locust bean gum or carob bean gum is the refined endosperm of the seed of the carob tree, *ceratonia siliqua*. The ratio of galactose to mannose for this type of gum is about 1:4. Cultivation of the carob tree is old and well known in the art of gum production. This type of gum is commercially available and may be obtained from TIC Gum, Inc. (Bekamp, Md.) and Rhodia, Inc. (Cranbury, N.J.).

4. Tara Gum

Tara gum is derived from the refined seed gum of the tara tree. The ratio of galactose to mannose is about 1:3. Tara gum is not produced in the United States commercially, but the gum may be obtained from various sources outside the United States.

C. Modified Galactomannans

Other galactomannans of interest are the modified galactomannans, including carboxymethyl guar, carboxymethylhydroxypropyl guar, cationic hydroxpropyl guar, hydroxyalkyl guar, including hydroxyethyl guar, hydroxypropyl guar, hydroxybutyl guar and higher hydroxylalkyl guars, carboxylalkyl guars, including carboxymethyl guar, carboxylpropyl guar, carboxybutyl guar, and higher alkyl carboxy guars, the hydroxyethylated, hydroxypropylated and carboxymethylated derivative of Guaran, the hydroxethylated and carboxymethylated derivatives of Carubin, the hydroxypropylated and carboxymethylated derivatives of Cassia-Gum and modified galactomannan or galactomannan gum. A preferred modified galactomannan is a hydroxypropyl guarwith low molecular substitution e.g., less than 0.6.

D. Xanthan

Xanthans of interest are xanthan gum and gel. Xanthan gum is a polysaccharide gum produced by *Xathomonas campestris*. Xanthan gum contains D-glucose, D-mannose, D-glucuronic acid as the main hexose units and also contains pyruvate acid and is partially acetylated.

According to the present invention, polysaccharide polymers, in particular, galactomannans such as solid guar gum, and xanthan such as xanthan gum are irradiated with high energy electron beams. The irradiation causes the polymers to depolymerize to a controlled lower molecular weight. The amount and period of such irradiation used is dependent on the particular material being treated. The type and amount of irradiation used may vary in relation to the particular polymer species which is processed according to the invention. The method of this invention is applicable to a wide variety of polysaccharides, but it is particularly applicable to galactomannans and modified galactomannans. The method is particularly useful for the depolymerization of guar gum or its derivatives, such as hydroxypropyl guar in the form of a powder or splits.

The polymer treated according to this invention is in the solid phase prior to, and during, treatment. The term "solid phase" includes powders, granules, flakes, particles, and the like. The irradiation is applied directly to the polymer in the solid phase, preferably as the polymer passes on trays on a production line continuous belt. According to this invention, the solid polymer to be depolymerized is placed in a tray up to a thickness to facilitate penetration of the solid material by the high energy electron beams. Polydispersity can be controlled by adjusting the thickness of the material. Polydispersity is reduced if all of the material is penetrated by the electron beam. The layer of solid material being depolymerized should have a substantially uniform thickness in order to obtain good polydispersity values for the depolymerized product. The polymer to be treated may be covered with a radiation pervious thin plastic film for safety reasons. The tray is then placed on a conveyor into a radiation chamber. The polymer is irradiated with high energy electron beams at a specified dose rate, depending upon the extent of depolymerization of the polymer to be obtained. In irradiation processing, dose is defined as the amount of energy absorbed by the target material. Dosages are defined either in units of gray or mega rads. One kilogray is equal to 1,000 joules per kilogram. A mega rad is equal to 1,000,000 ergs per gram. Accordingly, one mega rad equals 10 kilogray. The preferred dose is between about 1 and about 15 mega rads or about 10 to about 150 kilogray (kGy), which can be generated by a 4.5 MeV generator operating at 15 milliamps. Such a generator is available from E-Beam Services, Inc., of Plainview, N.Y.

The dose rate is the amount of time required to provide the irradiation dosage needed to depolymerize the polymer to the pre-selected molecular weight. This rate has a direct bearing on how long it takes to deliver a given dose, and therefore the amount of time that the polymer is exposed to ionizing radiation. High power beams generate the irradiation dose rapidly. As set forth in Table 1, even a lower power (1 kW) e-beam will deliver a target irradiation dose 40 times faster than its equivalent gamma irradiation. The use of high power beams allows a much higher production rate of depolymerized guar gum.

TABLE 1

Comparison of Irradiation Dosages by Gamma Process and Electron Beam Process

| | Gamma Process | E-BEAM Process |
|---|---|---|
| Target dose | 20 kGy | 20 kGy |
| Dose rate (process-specific) | 10 kGy/hr | 400 kGy/hr |
| Time to deliver dose | 2 hrs (120 min) | 0.05 hrs (3 min) |

The high power beam irradiation of the polymer is carried out preferably at room temperature, and can be carried out at higher and lower temperatures.

A high voltage beam generator producing 1-10 MeV dosages is preferred because it penetrates deep into the materials, allowing a thicker layer of material to be irradiated. Higher than 10 MeV may be used, but this is not preferred because it may generate radioactivity from high-Z elements. A high voltage beam generator may be obtained from Electron Solutions Inc. and Science Research Laboratory, Somerville, Mass., Ion Beam Applications, Louvain-la-Neuve, Belgium and The Titan Corporation, San Diego, Calif.

A low voltage beam generator (150 keV-1 MeV) is also preferred. The material will be irradiated as a layer as it passes through; optionally, the irradiation is performed after the material has been mechanically ground to a powder. Such a generator is generally cheaper and does not require concrete shielding. A low voltage beam generator may be obtained from EZCure by Energy Sciences, Inc., Wilmington, Mass., Easy E-beam by Radiation Dynamics Inc., Edgewood, N.Y. and EB-ATP by Electron Solutions Inc., Somerville, Mass. This equipment is conventionally used primarily for surface irradiation curing.

As noted above, the degree of depolymerization is influenced by the molecular weight of the original polymer being treated and the preselected molecular weight of the depolymerized product. Guar gum has a molecular weight of over 2,000,000 Daltons and generally between 2,000,000 Daltons and 5,000,000 Daltons. In a preferred operation of this invention, the polymer will be depolymerized to below about 700,000 Daltons, more preferably to below about 500,000 Daltons, even more preferably to below about 300,000 Daltons, and most preferably to between about 100,000 Daltons and 250,000 Daltons. By the use of this invention, galactomannan polymers can be depolymerized to products having molecular weights lower than the above-referenced molecular weights, and most preferably between about 100,000 Daltons and about 250,000 Daltons.

As discussed in more detail below, the depolymerized galactomannans change to a more than 90% hydrated states within three (3) minutes.

As noted above, the depolymerized guars are useful for facilitating oil production. The productivity of oil and gas wells can be increased by fracturing and opening up the oil or gas bearing zones with hydraulic pressure. Hydroxypropyl guar gum solution and similar gelling agents are used in this process, which is known as hydraulic fracturing. In practicing this process, a highly viscous liquid fracturing fluid carrying a proppant, such as sand, is pumped under very high pressure out into the oil or gas-bearing formation, thus producing fractures in the formation. The proppant keeps the fractures open when the hydraulic pressure is released. Oil and gas are then recovered at an increased rate.

Galactomannans, such as guar or hydroxypropyl guar, are added to the fracturing fluid to increase its viscosity and proppant transport capability. Additionally, in the case of guar gum and splits, hydroxypropyl guar gum and the like, the viscosity and proppant transport capacity can be even further increased by the use of crosslinking additives. Some well-known crosslinking additives include borates, as described in U.S. Pat. No. 3,974,077, and titanate or zirconate organometallic crosslinking agents, as described in U.S. Pat. Nos. 4,657,080 and 4,686,052, respectively. It has been found, however, that a fracturing fluid that is excessively viscous can fill the fractures and thereby hinder the recovery rate of oil or gas. The reduction of the viscosity of the fracturing fluid by substituting depolymerized guar gum made according to this invention in place of native guar gum would alleviate this problem.

As noted above, the depolymerized galactomannans xanthan and xanthan gum are useful in food applications, cosmetics, pharmaceuticals and other industrial applications such as flowable pesticides, liquid feed supplements, cleaners, ceramics and coatings. More specifically, the depolymerized guar would be used in a variety of food products, including confectioneries, processed fruits and vegetables, beverages, sauces and dressings to provide texturing. The depolymerized galactomannans would also be useful in providing texturing to dairy products, cheese, soups and pet food, and texturing and pre-water binding for meat products.

The following examples of the invention are provided for illustrative purposes only. They are not in any way intended to limit the invention.

EXAMPLE 1

The following is an example of the depolymerization of guar gum, guar splits and guar derivatives by high electron beam irradiation.

Guar splits, guar gum in powder form or hydroxypropyl guar gum in powder form was put into a container and covered with very thin plastic film. The samples were irradiated by electron beam, generated by 4.5 MeV generator operating at a 15 milliamp beam current, directed at the top surface of the tray. The dosages employed were 1 Mrad, 3 Mrads, 5 Mrads, 10 Mrads and 15 Mrads.

After irradiation, the molecular weight of the treated sample was analyzed by gel permeation chromatogram (column, Supelco Progel-TSK G3000PW$_{XL}$ and G6000PW$_{XL}$ in series; mobile phase, 55 mM $Na_2SO_4$, 0.02% $NaN_3$; flow rate, 0.6 ml/min; detector, Waters 410 Refractive index; inj. Volume, 200 μl; temperature, 40° C.). The samples were dissolved in the mobile phase to give 0.025% solutions by weight. The calibration curve was generated using stachyose and two guar gum samples of molecular weights of 667, 58,000 and 2,000,000 Daltons The results obtained are shown in Table 2.

The decrease in molecular weights with the irradiation dose is clearly demonstrated by the three different types of samples (FIG. 1). The degree of depolymerization increased with increased irradiation doses. The depolymerization degree was similar among different materials treated, and no dramatic changes were observed for guar gum powder, guar splits or hydroxypropyl guar gum powder. The degree of depolymerization, or the molecular weights, can be correlated with the dosage (FIG. 1) and, therefore, the molecular weight reduction for a given dosage, can be easily predicted provided the initial molecular weight is known before the irradiation.

TABLE 2

Molecular Weight Distribution of Irradiated Guar

| Sample | Peak Mp | Wt. Avg. $M_w$ | No. Avg. $M_n$ | Polyoldispersity $M_w/M_n$ |
|---|---|---|---|---|
| Hydroxypropyl guar powder, 1 M rad | 417,000 | 513,000 | 149,000 | 3.44 |
| Hydroxypropyl guar powder, 3 M rad | 173,000 | 227,000 | 67,000 | 3.35 |
| Hydroxypropyl guar powder, 5 M rad | 117,000 | 141,000 | 43,000 | 3.28 |
| Hydroxypropyl guar powder, 10 M rad | 64,700 | 77,500 | 25,200 | 3.07 |
| Hydroxypropyl guar guar, 15 M rad | 43,500 | 53,800 | 17,400 | 3.08 |
| Guar powder, 0 rad | 2,960,000 | 2,860,000 | 1,200,000 | 2.37 |
| Guar powder, 1 M rad | 474,000 | 571,000 | 161,000 | 3.54 |
| Guar powder, 3 M rad | 196,000 | 249,000 | 78,900 | 3.16 |
| Guar powder, 5 M rad | 110,000 | 132,000 | 41,800 | 3.16 |
| Guar powder, 10 M rad | 59,900 | 68,100 | 21,700 | 3.13 |
| Guar powder, 15 M rad | 39.900 | 46,400 | 14,900 | 3.11 |
| Guar Splits, 1 M rad | 588,000 | 706,000 | 224,000 | 3.16 |
| Guar Splits, 3 M rad | 241,000 | 314,000 | 118,000 | 2.66 |
| Guar Splits, 5 M rad | 120,000 | 140,000 | 49,400 | 2.83 |
| Guar Splits, 10 M rad | 84,900 | 94,200 | 35,000 | 2.69 |
| Guar Splits, 15 M rad | 47,200 | 58,000 | 19,400 | 2.99 |

EXAMPLE 2

The following is an example of the depolymerization of various guar types using lower energy beam.

Guar Splits (DPS), guar gum powder (Jaguar 6003VT) and hydropropyl guar gum (HPG, Jaguar 8000) were irradiated at 10 Mrad on a 200 keV beam at Energy Science Incorporation. The molecular weights were measured in the same way as described above. Not surprisingly, the powder form of Jaugar 6003VT and 8000 were depolymerized while little impact was observed on the splits. See Table 3. In comparison with high energy electron beam, the absorbed dose is greatly reduced due to the limited penetration of the electron beam irradiation. The powder samples of Jaguar 6003VT and 8000 indeed received a certain dose and were depolymerized, since the powder was placed in a very thin layer. Nevertheless, a relatively high polydispersity (3-4) of the depolymerized product was observed, as compared with higher energy beams, where polydispersity of the polymerized product was usually 2-3. On the other hand, the penetration depth into the splits was too little to cause any detectable depolymerization of the splits. At lease half of the energy was consumed by the plastic package, although 10 Mrad surface dose was delivered from the system. These results showed that depolymerized is possible under the low energy beam, provided the material is properly delivered under the beam with the appropriate thickness/density.

TABLE 3

Depolymerization of Guar Under Low Energy Beam at 10 Mrad

| Guar | Peak MW $M_p$ | Wt. Avg. $M_w$ | No. Avg. $M_n$ | Polydispersity $M_w/M_n$ |
|---|---|---|---|---|
| Guar Splits | 1,6000,000 | 1,310,000 | 311,000 | 4.20 |
| Jaguar 6003 VT | 171,000 | 231,000 | 69,900 | 3.31 |
| Jaguar 8000 | 166,000 | 301,000 | 65,200 | 4,62 |

EXAMPLE 3

In this example, the depolymerization of guar gum and guar splits was carried out to provide an useful oil well fracturing fluid.

Several different types of guar and guar derivatives, namely, guar splits, Jaguar 8000 (HPG) and Agent AT-2001 base were selected and depolymerized. (Agent AT-2001 base is the current guar-containing product conventionally depolymerized by hydrogen peroxide for oil field applications before depolymerization.) According to the Material Safety Data Sheet for Agent AT-2001 base, Agent AT-2001 base contains greater than 85% 2-hydroxypropyl ether guar gum, less than 3% sodium hydroxide and the rest water. These samples were packed in plastic bags with a thickness less than effective thickness of the e-beam and then irradiated at 3.8 Mrad dose using a 4.5 MeV electron 3-beam generator. The molecular weights of the samples were then analyzed days after the irradiation. The results obtained are shown in Table 4.

All samples of guar splits, Jaguar 8000 and Agent AT-2001 base were successfully depolymerized to the desired range. No discrepancy was found among 4 parallel samples of Agent AT-2001 base and between 2 parallel samples of Guar splits. The reproducibility was found to be excellent. Good polydispersity (<3) values were found for all the depolymerized guar or its derivatives in comparison with current $H_2O_2$ depolymerized guar. A typical polydispersity currently observed for the chemical process is between 3 and 5. However, there were slight differences in the molecular weight of the individual products, which can be easily targeted by adjusting the radiation level. This is probably due to the variation in the composition of the starting products of guar splits, Jaguar 8000 and Agent AT-2001 base.

TABLE 4

Reproducibility of e-Beam Depolymerization

| Sample | Peak MW $M_p$ | Wt. Avg. $M_w$ | N. Avg. $M_n$ | Polydispersity $M_w/M_n$ |
|---|---|---|---|---|
| Agent AT-2001 base: | | | | |
| #1 | 118,000 | 136,000 | 52,800 | 2.57 |
| #2 | 116,000 | 133,000 | 54,600 | 2.43 |
| #3 | 113,000 | 132,000 | 51,600 | 2.56 |
| #4 | 114,000 | 130,000 | 52,700 | 2.48 |
| Average | 115,250 | 132,750 | 52,925 | 2.51 |
| % Std Dev. (n − 1) | 1.9 | 1.9 | 2.3 | 2.7 |
| Jaguar 8000 | 138,000 | 185,000 | 68,700 | 2.69 |
| Agent AT-2001 base-water swollen splits | 100,000 | 117,000 | 49,000 | 2.39 |
| Guar Splits #1 | 185,000 | 238,000 | 94,500 | 2.52 |
| Guar Splits #2 | 194,000 | 264,000 | 99,200 | 2.66 |

EXAMPLE 4

In this example, the crosslink ability of Agent AT-2001 base was investigated.

The viscosity of separate solutions of Agent AT-2001 base and Jaguar 8000 in distilled water were determined and were found to be within the expected range based on the molecular weight.

2.5% Agent AT-2001 base, 3.8 Mrad: 14.5 cP at 511/sec and 75° F.

2.5% Jaguar 8000, 3.8 Mrad: 40 cP at 511/sec and 75° F.

The current Agent AT-2001 base is used in the oil field application in crosslinked forms. It is important to make sure that electron-beam irradiated Agent AT-2001 base can also be crosslinked. This test will also assist in the determination of whether there are any significant functional group changes accompanying the irradiation depolymerization. Thus, a 2.5% solution of Agent AT-2001 base, depolymerized from Agent AT-2001 base by irradiation, was mixed with borax cross linker and NaOH to increase the pH. Within a few seconds, the polymer solution became a gel. This test confirms that electron beam irradiated Agent AT-2001 base can be crosslinked with borax crosslinkers.

EXAMPLE 5-7

Examples 5-7 describe the depolymerization of Agent-AT-2001 base in pilot trials.

The pilot trials were carried out at IBA's pilot facility at Long Island, N.Y. Samples were put in plastic trays of 19×19×5 cm as a thin layer, and covered with a plastic cover. The depth of the material was determined by the weight, density and area. The trays were then irradiated on a moving table. Surface dose, electron energy and samples thickness were varied. Materials from different lots of Agent AT-2001 base were also examined.

For all samples treated, the color intensified with the dosage, and radiation shadow was observed near at least one side of each tray. A faster hydration was observed after irradiation. More than 90% viscosity (the maximum) was obtained within 3 minutes, and it reached a plateau within 10-15 minutes. By this definition, 100% is defined as complete hydration. The viscosity of the irradiated materials was measured, and the protocol described in the previous section was adopted. This viscosity was used as an alternative for analyzing the degree of depolymerization. Molecular weights were determined by gel permeation chromatogram only for selective samples.

The extent of the depolymerization of the irradiated Agent AT-2001 base was examined by measuring the viscosity immediately after the irradiation (within two (2) hours) and several days later. The data were collected after the polymer was completely hydrated in water. It was shown that the depolymerization continued after the irradiation stopped (See Table 5). This phenomenon is common for all irradiation done in the solid state, as the active species can easily be trapped in the lattices of the irradiated materials. These species cause further reaction and can last from seconds to days—even years—depending on temperature, solvent contents, and the material itself. Further examination of the phenomena for Agent AT-2001 base is described below.

Figure 4:
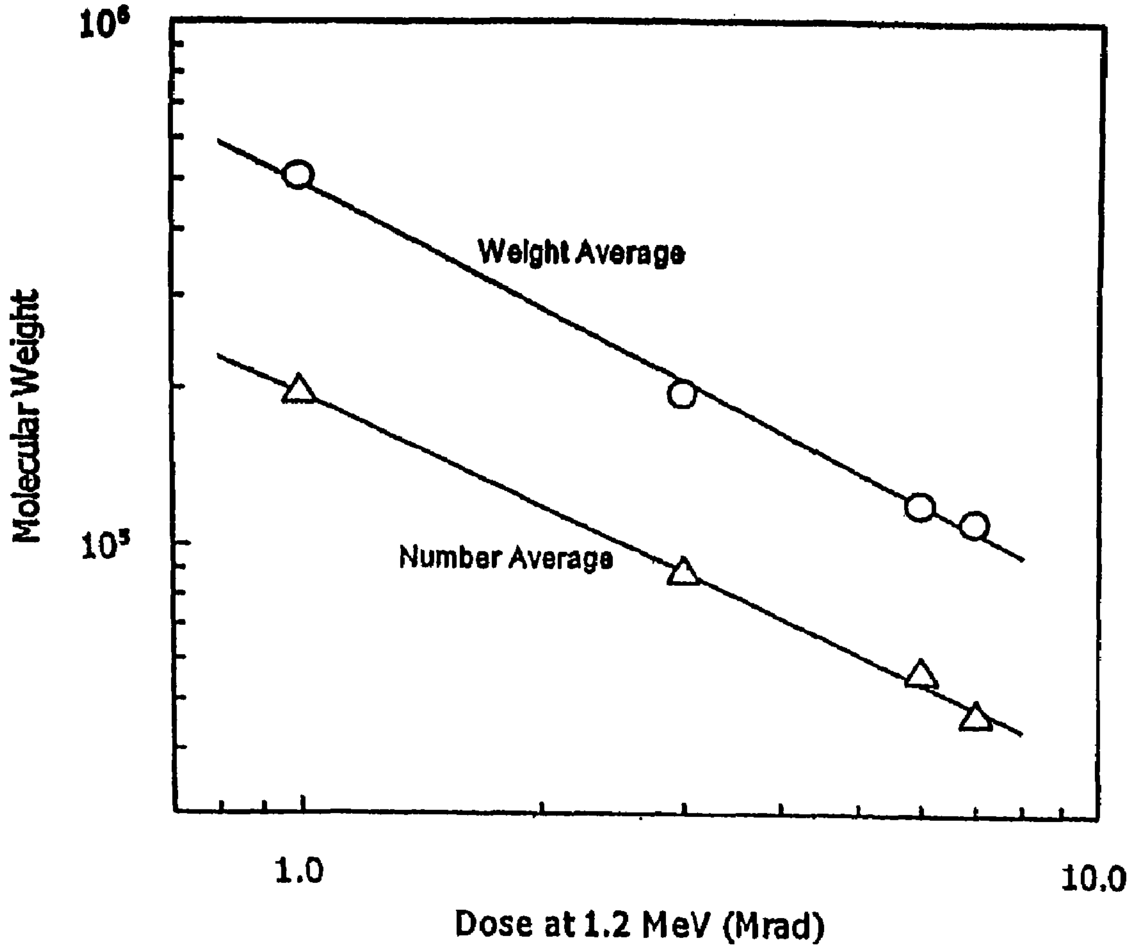
FIG. 4 is a graph showing a decrease in the weight average and number average molecular weight of guar gum obtained from Agent AT-2001 guar comprising hydroxypropyl guar and a small amount of sodium hydroxide.

The results clearly showed that the polymer was depolymerized. The viscosity decreases as the dose increases for all three levels of electron energy. The molecular weights of selective samples were determined by GPC and are shown in Table 7 and plotted in FIG. 4. Very good linear correlation of MW-dose (D, Mrad) is observed for both weight average (Mw) and number average (Mn) molecular weights:

Log(Mw)=5.6906−0.7881 log(D), correlation coefficient=-0.9979

Log(Mn)=5.2894−0.7176 log(D), correlation coefficient=-0.9987

Polydisperity for these samples ranges from 2.1 to 2.6 (See Table 7), which is better than those previously observed. These desirable polydispersity values could result from a mode uniform thickness and less materials being submitted to irradiation outside the effective thickness. The thickness effect will be discussed below.

Experience has shown that a slightly higher surface dose is needed with lower electron energy. This could be due to the energy loss before the electrons enter the materials and by the variations in the depth-dose profile for different electron energy. The latter determines the accumulative dose or energy delivered by the electrons.

TABLE 5

| Viscosity Decrease with Time after Irradiation | | | | | | | | | | |
|---|---|---|---|---|---|---|---|---|---|---|
| Energy (MeV) | 1.2 | 1.2 | 1.2 | 1.2 | 1.2 | 1.2 | 1.2 | 3 | 3 | 3 |
| Dose (Mrad) | 3 | 4 | 5 | 6 | 7 | 8 | 6 | 6 | 5 | 4 |
| Thickness (cm) | 0.36 | 0.36 | 0.36 | 0.36 | 0.36 | 0.36 | 0.20 | 1.52 | 1.52 | 1.53 |
| Viscosity | 105 | 66 | 46 | 26 | 24 | 18 | 26 | 19 | 23 | 33 |
| Viscosity | 34 | 28 | 31 | 32 | 12 | 11 | 13 | 14 | 20 | 26 |
| Viscosity | 35 | 29 | 32 | 32 | 13 | 11 | 14 | 24 | 21 | 26 |

Example 5 concerns the effect of different irradiation doses on the depolymerization of the polymer.

Samples of Agent AT-2001 base were placed on a tray with a thickness corresponding to the effective thickness of the specified electron energy. The irradiation was done with various doses and at three energy levels, 1.2 MeV (with 0.2 MeV for the loss of energy from the package), 1.5 and 3.0 MeV. For 1.2 MeV, 90 grams of sample was spread inside the tray (3.6 mm thick at d=0.7), and then irradiated incrementally at 1 Mrad to obtain various dosages. For 1.5 MeV, 160 g of sample (6.4 mm at d=0.7) was used for each trial, the samples were given an initial 4 Mrad dose, and then irradiated incrementally at 1 Mrad to give 5, 6 and 7 Mrad. One pass of irradiation was used for all irradiation done at 3.0 MeV. The viscosity was checked with a Fann 35 viscometer from Baroid in Houston, Tex., at 300 rpm with 2.5% active material, while assuming moisture was accounted as ~10% (See Table 6). A viscosity of 23-28 cps was targeted for the purpose of running application tests.

TABLE 6

| Dose (Mrad) | Depolymerization of Agent AT-2001 Base — Viscosity (cps) 1.2 MeV) .36 cm | 1.5 MeV/0.64 cm | 3.0 MeV/1.52 cm |
|---|---|---|---|
| 1 | 3800 | — | — |
| 2 | 96 | — | — |
| 3 | 35 | — | — |
| 4 | 29 | 36 | 26 |
| 5 | 32 | 34 | 21 |
| 6 | 10 | 27 | 14 |
| 7 | 13 | 22 | — |
| 8 | 11 | — | — |

TABLE 7

| Depolymerization of Agent AT-2001 base with Various Doses | | | | | |
|---|---|---|---|---|---|
| Dose (Mrad)/ Energy (MeV) | Viscosity cP | Peak MW $M_p$ | Wt. Avg. $M_w$ | No. Avg. $M_n$ | Polydispersity $M_w/M_n$ |
| 1/1.2 | 3,800 | 368,000 | 504,000 | 195,000 | 2.59 |
| 3/1.2 | 35 | 163,000 | 194,000 | 87,500 | 2.22 |
| 6/1.2 | 19 | 116,000 | 119,000 | 56,200 | 2.12 |
| 7/1.2 | 13 | 101,000 | 110,000 | 46,600 | 2.37 |
| 4/3.0 | 26 | 129,000 | 150,000 | 60,000 | 2.46 |
| 5/3.0 | 21 | 115,000 | 153,000 | 60,000 | 2.55 |

Example 6 concerns the effect of sample thickness of the material (Agent AT-2001 base) being irradiated on molecular weight and polydispersity.

Figure 5:
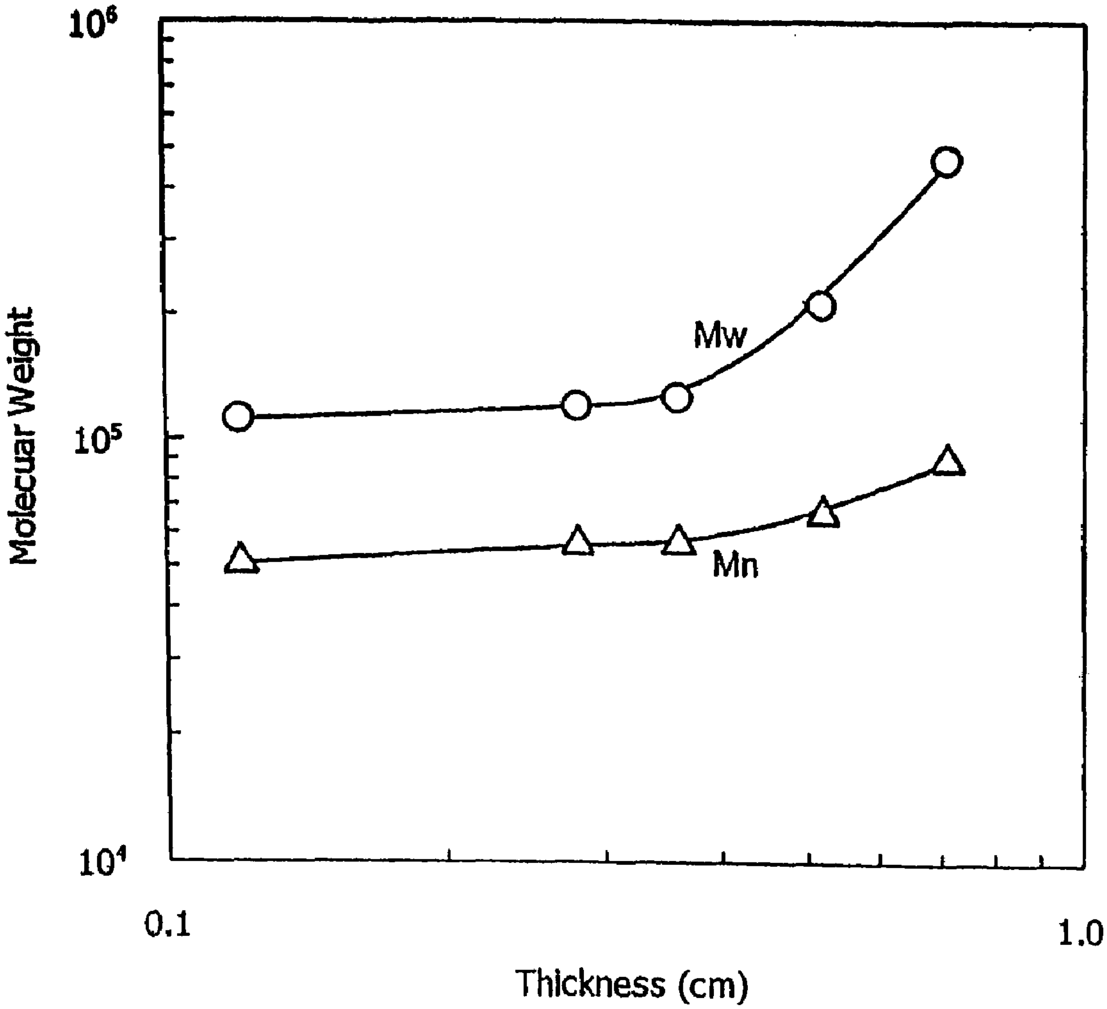
FIG. 5 is a graph showing the effect of sample thickness on the number average molecular weight and weight average molecular weight of depolymerized guar.
Figure 6:
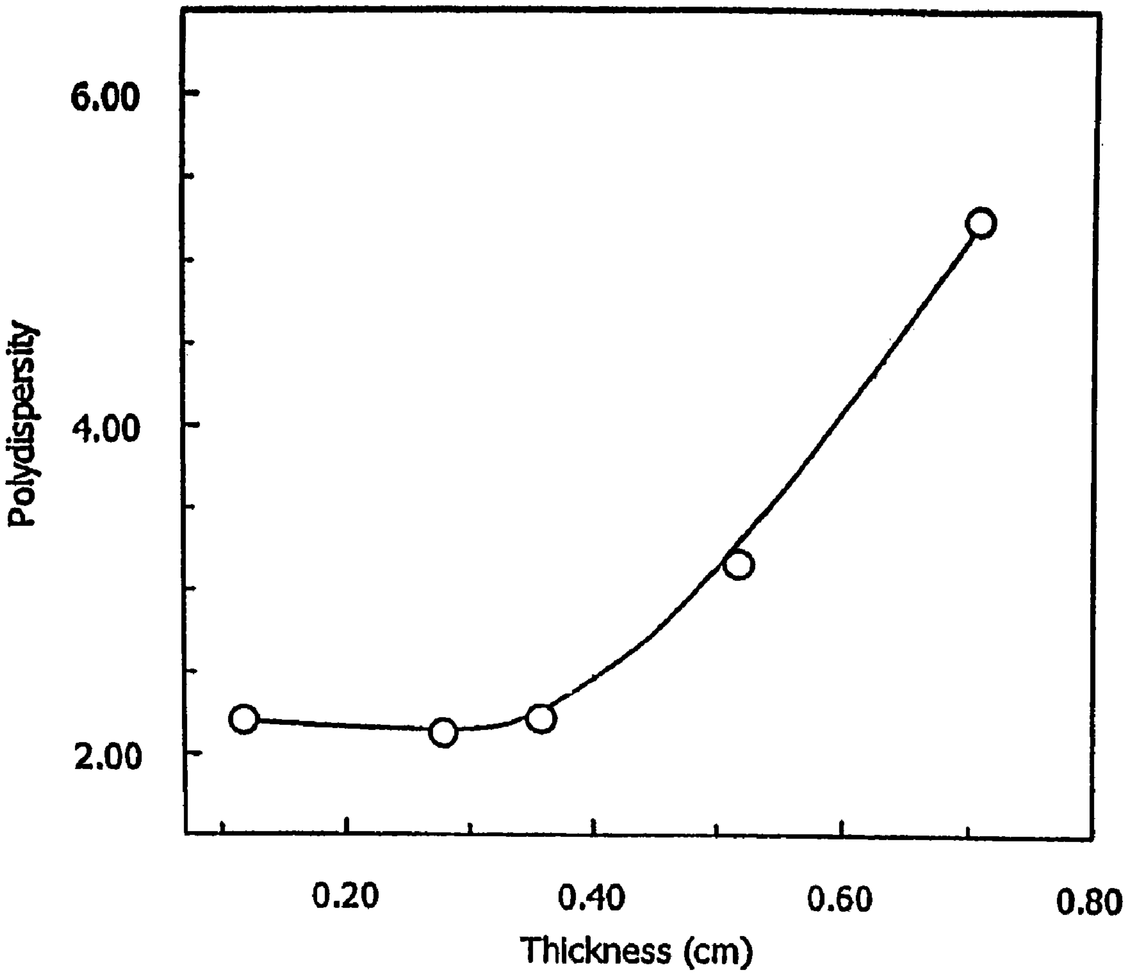
FIG. 6 is a graph showing the effect of sample thickness on the polydispersity of irradiated guar.

The irradiation was done with 1.2 MeV of electron energy at a dose of 6 Mrad. Various amounts of samples were spread inside the tray. After the irradiation, the samples were cooled for at least one day and then analyzed. Viscosity and molecular weight were collected in the same manner as described above (See Table 8). In order to obtain a narrow polydispersity, irradiation has to be done within the effective thickness to ensure a more homogeneous distribution of dose along the path (effective thickness=0.36 cm for guar or 0.25 g/cm$^2$ at 1.0 MeV). In FIGS. 5 and 6 is clearly shown the effect of sample thickness on the molecular weights and polydispersity, respectively. Within the effective thickness, both molecular weights and polydispersity remain almost constant. They increase exponentially upon increase in sample size above the effective thickness. Effective thickness varies with the beam energy in MeV.

TABLE 8

Depolymerization of Agent AT-2001 Base with Various Sample Thicknesses*

| Dose (Mrad) | Viscosity cP | Peak MW $M_p$ | Wt. Avg. $M_w$ | No. Avg. $M_n$ | Polydispersity $M_w/M_n$ |
|---|---|---|---|---|---|
| 0.12 | 14 | 116,000 | 111,000 | 50,400 | 2.20 |
| 0.28 | 15 | 116,000 | 119,000 | 56,200 | 2.12 |
| 0.36 | 19 | 122,000 | 125,000 | 56,600 | 2.21 |
| 0.52 | 36 | 126,000 | 210,000 | 66,700 | 3.15 |
| 0.71 | 2,500 | 135,000 | 467,000 | 89,100 | 5.24 |

*Irradiation at 1.2 MeV with 6 Mrad. surface dose

Example 7 concerns the effect of using different lots of Agent AT-2001 base.

Agent AT-2001 base is manufactured from guar gum by hydroxypropylation in the presence of sodium hydroxide. Both the nature of guar gum and the hydroxypropylation processing itself tend to cause variations in different lots of Agent AT-2001 base. It is known that these variations can change its reactivity with hydrogen peroxide, thus resulting in different levels of depolymerization. However, as demonstrated above in Example 1, the irradiation method of the invention produces depolymerization to preselected molecular weights among guar, guar powder and hydroxypropyl guar. Accordingly, variation in different lots of Agent AT-2001 base was not expected to cause any observable difference in the degree of depolymerization obtained under irradiation. As a check, four different lots of Agent AT-2001 base were irradiated within the effective thickness at 5 Mrad, and the solution viscosity was measured as described above. No plastic sheet covered the samples. With the sample thickness ranging from 0.76 to 1.27 cm, less than the effective thickness of 1.52 cm at beam power of 2.2 MeV, the discrepancy in sample thickness was reduced to minimum in order to assess variations in different lots. As shown in Table 9, the irradiated samples gave viscosity range form 11 to 15 cP, well within experimental error. The average viscosity was 13.4 cP and standard deviation (n−1) was 1.13. No abnormal depolymerization upon irradiation in different lots was observed.

TABLE 9

Depolymerization of Various Lots of Agent AT-2001 Base*

| Lot # | Weight, g | Thickness, cm | Viscosity,$^{cP25,29}$ |
|---|---|---|---|
| H0210-997A | 317 | 1.27 | 12.8 |
| H0210-071CR | 297.1 | 1.19 | 14.4 |
| H0210-071AR | 297 | 1.19 | 15 |
| H0210-997HR1 | 284.4 | 1.14 | 12.6 |
| H0210-071DR | 269.8 | 1.08 | 13.6 |
| H0210997HR | 270 | 1.08 | 14 |
| H0210997HR | 320 | 1.28 | 13.6 |
| H0210997HR | 190 | 0.76 | 11.4 |

*Irradiation at 2.2 MeV

EXAMPLES 8-12

Examples 8-12 concern the depolymerization of Agent AT-2001 base at plant trials.

In these examples, the irradiations were conducted at 2.2 MeV in IBA's Gaithersburg production plant. According to data obtained previously, a dose of 4 Mrad and a load of 0.79 g/cm$^2$, i.e., 14 lb/tray (8000 cm$^2$) are the targeting parameters in order to produce a product with molecular weight of about 200,000 Daltons. The load in the tray corresponded to the effective thickness of the beam. The radiation dose, thickness and lots were examined. The results of the trials carried on there are listed in Table 10. The samples were weighted on the tray, spread and leveled manually. There was considerable variation in the thickness as no mechanical leveling was available. Samples were taken from all trials. The viscosity was measured on Fann 35 after dissolving 5.55 g of the irradiated material with 1.5 g of sodium monophosphate in water room temperature. The results are given in Table 9.

TABLE 10

| Trial # | Dose, Mrad | lb/tray | Lot # |
|---|---|---|---|
| 1 | 3 | 14 | H0303221AR |
| 2 | 4 | 14 | H0303221AR |
| 3 | 5 | 14 | H0303221AR |
| 4 | 4 | 16.5 | H0303221AR |
| 5 | 4 | 11.5 | H0303221AR |
| 6 | 4 | 14 | H0303192CR |
| 7 | 4 | 14 | H0212269KR |
| 8 | 6 | 14 | H0303221AR |

Example 8 concerns the measurement of viscosities over time of depolymerized Agent AT-2001 base produced in the trial described.

A sample from Trial 2 (tray #17, 4 Mrad, 14 lb/tray, Lot H0303221AR) was taken about 15 minutes after irradiation. The viscosity was measured thereafter, and then measured after 1.5 hr and 1 day (See Table 11). The viscosity of all samples from the trial also measured 20 to 90 minutes and 1 day after the irradiation (See Table 12). Some samples showed significant viscosity variation between measurements made immediately (20-90 after irradiation) and 1 day later. This variation is probably attributable to the fast drop-off right after the irradiation, as the time between irradiation and measurement of viscosity was different for each individual sample. Table 12 clearly shows the fast drop-off within the time frame. This result indicates that a minimum one hour is required after irradiation before the viscosity stabilizes. In the following examples the viscosity after one day is used for comparison when no further drop is observed.

TABLE 11

Viscosity change with time

| Time (h) | Viscosity (cps) |
|---|---|
| 0.25 | 47 |
| 1.5 | 35 |
| 24 | 29 |

In Example 9, product samples produced in Trial 2 described before were tested for uniformity of Agent AT-2001 base.

In Trial 2 (4 Mrad, 14 lb/tray, Lot H0303221AR), three samples were taken from different locations in a single tray and three other samples were taken from different trays. There was considerable variation within a tray and between trays (See Table 12). Given that the viscosity of the materials is fully stabilized after one day, the average of three samples within a tray is 34.6±12.1 and that of six samples across four different trays is 33.9±12.0. These variations are most likely caused by the thickness variations, which will be described in the next example.

TABLE 12

Viscosity of Samples

| | | | | | | | | | | | | | |
|---|---|---|---|---|---|---|---|---|---|---|---|---|---|
| Trial # | 1 | 2 | 2 | 2 | 2 | 2 | 2 | 4 | 5 | 6 | 7 | 3 | 8 |
| Lot ID | A | A | A | A | A | A | A | A | A | B | C | A | A |
| Dose (Mrad) | 3 | 4 | 4 | 4 | 4 | 4 | 4 | 4 | 4 | 4 | 4 | 5 | 5 |
| Wt (lb) tray | 14 | 14 | 14 | 14 | 14 | | | | | | | | 14 |
| Thickness (cm) | 1.13 | 1.13 | 1.13 | 1.13 | 1.13 | 1.13 | 1.13 | 1.33 | 0.93 | 1.13 | 1.13 | 1.13. | 1.13 |
| Tray # | | | 3 | | 5 | 7 | 8 | | | | | | |
| Sample | | A | B | C | | | | | | | | | |
| Viscosity[1] | 72 | 23 | 34 | 46 | 44 | 47 | 44 | 44 | 26 | 24 | 37 | 34 | 18 |
| Viscosity[2] | 44 | 17 | 26 | 43 | 37 | 29 | 45 | 40 | 24 | 22 | 33 | 27 | 19 |
| Viscosity[3] | 45 | 18 | 26.6 | 43.6 | 38 | 30 | 47 | 41 | 26 | 23 | 34 | 29 | 20 |

[1]Viscosity was measured within 2 hours of irradiation with a hydration time of 3 minutes.
[2]Viscosity was measured within 1 day with a hydration time of 3 minutes.
[3]Viscosity was measured within 1 day with a hydration time of 15 minutes.

In Example 10, the effect of the thickness of the material being irradiated was evaluated in terms of product viscosity.

Trials 4 and 5 were irradiated at 4 Mrad with intentionally 20% more and 20% less materials (Lot H0303221AR) on the tray respectively. In comparison with the average value from Trial 2, the trend is clearly seen (See Table 13). As the tray was not leveled very well, irradiation outside the effective thickness most likely occurred even with 20% less than the effective thickness. The viscosity given here is just an average.

TABLE 13

Thickness Effect

| | Trial # | | |
|---|---|---|---|
| | 4 | 2 (average) | 5 |
| | wt (lb) tray | | |
| | 16.5 | 14 | 11.5 |
| | Thickness (cm) | | |
| | 1.33 | 1.13 | 0.93 |
| Viscosity[1] | 44 | 40 | 26 |
| Viscosity[2] | 40 | 33 | 24 |
| Viscosity[3] | 41 | 34 | 26 |

[1]See Table 12.
[2]See Table 12.
[3]See Table 12.

In Example 11, the effect of irradiation dose on product viscosity was evaluated.

The same lot (H0303221AR) was irradiated at 3, 4, 5 and 6 Mrad in Trial 1, 2, 3 and 8 respectively. As the dose goes up, a lower viscosity is expected. The trend was clearly seen when compared with the average value from Trial 2 (See Table 14).

TABLE 14

Dose Effect

| | Trial # | | | |
|---|---|---|---|---|
| | 1 | 2 (average) | 3 | 8 |
| | Dose (Mrad) | | | |
| | 3 | 4 | 5 | 6 |
| Viscosity[1] | 72 | 40 | 34 | 18 |
| Viscosity[2] | 44 | 33 | 27 | 19 |
| Viscosity[3] | 45 | 34 | 29 | 20 |

[1]See Table 12.
[2]See Table 12.
[3]See Table 12.

In Example 12, the effect of using different lots of Agent AT-2001 base was evaluated.

Three different lots 0303221AR, H0303192CR and H0212269KR were irradiated under the same conditions, i.e., 4 Mrad and 14 lb/tray. No significant variation was observed in comparison with the average value from Trial 2. The variation observed appears mainly to come from the leveling of the tray rather than from the variation of the lots (See Table 15). At the same dosage, the viscosity of the three lots varied between 24-45 cP. Since there was considerable variation from 18 to 47 cP on the same lot (See Trial 2, Lot A, 4 Mrad in Table 12), it is difficult to determine how much of the variation is due to different lots and how much is due to sampling effects.

TABLE 15

Lot Variations

| Lot ID | A (average) | B | C |
|---|---|---|---|
| Viscosity[1] | 40 | 24 | 37 |
| Viscosity[2] | 33 | 22 | 33 |
| Viscosity[3] | 34 | 23 | 34 |

[1]See Table 12.
[2]See Table 12.
[3]See Table 12.

While certain embodiments of the present invention have been described and/or exemplified above, various other embodiments will be apparent to those skilled in the art from the foregoing disclosure. The present invention is, therefore, not limited to the particular embodiments described and/or exemplified, but is capable of considerable variation and modification without departure from the scope of the appended claims.

What is claimed is:

1. A method of depolymerizing polysaccharides selected from the group consisting of galactomannans, modified galactomannans and xanthan to a pre-selected molecular weight comprising the step of subjecting the polysaccharides to radiation consisting essentially of electron beams.

2. The method of claim 1, wherein the galactomannans are depolymerized to a molecular weight of less than about 700,000 Daltons.

3. The method of claim 1, wherein the galactomannans are depolymerized to a molecular weight of less than about 500,000 Daltons.

4. The method of claim 1, wherein the galactomannans are depolymerized to a molecular weight of less than about 300,000 Daltons.

5. The method of claim 3, wherein the galactomannans are depolymerized to a molecular weight of between about 100,000 Daltons and about 250,000 Daltons.

6. The method of claim 1, wherein the galactomannans are present in a material selected from the group consisting of guar gum, guar splits, hydroxypropyl guar, cationic guar, locust bean guar, tara guar, carboxymethyl guar, carboxymethyl hydroxypropyl guar, cationic hydroxyproxyl guar, hydroxyl alkyl guar and carboxyalkyl guar.

7. A galactomannan produced according to the method of claim 1.

8. The galactomannan of claim 5, wherein the galactomannan is selected from the group consisting of guar gum, guar splits, hydroxypropyl guar, cationic guar, locust bean guar, tara gum, carboxymethyl guar, carboxymethylhydroxypropyl guar, cationic hydroxpropyl guar, hydroxyalkyl guar and carboxyalkyl guar.

9. An oil well fracturing crosslinking agent, said agent comprising a) an additive; and b) a galactomannan which is crosslinkable with said additive and has a molecular weight of between about 100,000 Daltons and about 250,000 Daltons and also has a polydispersity of below about 2.7 and is at least 90% hydrated within three (3) minutes.

10. The fracturing agent of claim 9, wherein the crosslinking additive is selected from the group consisting of borate, titanate or zirconate organometallic crosslinking agents.

11. The fracturing agent of claim 9, wherein the agent further comprises a proppant.

12. An oil well fracturing agent, said agent comprising:

a) a proppant; and b) a galactomannan which has a molecular weight of between about 100,000 Daltons and about 250,000 Daltons, wherein the galactomannan also has a polydispersity of below about 2.7 and is at least 90% hydrated within three (3) minutes.

13. An oil well fracturing agent, said agent comprising:

a) a proppant;

b) a crosslinking additive; and c) a galactomannan which is crosslinkable with said additive and has a molecular weight of between about 100,000 Daltons and 250,000 Daltons and a polydispersity of below about 2.7.

14. An oil well fracturing agent, said agent comprising:

a) a proppant;

b) a crosslinking additive; and c) a galactomannan which has a molecular weight of between about 100,000 Daltons and about 250,000 Daltons and also has a polydispersity of below about 2.7 and at least 90% changes to a hydrated product within three (3) minutes.

* * * * *